United States Patent
Hsu

(10) Patent No.: US 10,542,837 B2
(45) Date of Patent: Jan. 28, 2020

(54) MULTIPURPOSE INFUSER FILTER STRAINER

(71) Applicant: Tien-Chang Hsu, Taipei (TW)

(72) Inventor: Tien-Chang Hsu, Taipei (TW)

(*) Notice: Subject to any disclaimer, the term of this patent is extended or adjusted under 35 U.S.C. 154(b) by 443 days.

(21) Appl. No.: 15/348,270

(22) Filed: Nov. 10, 2016

(65) Prior Publication Data

US 2017/0258260 A1 Sep. 14, 2017

(30) Foreign Application Priority Data

Mar. 14, 2016 (TW) .............................. 105203494 U

(51) Int. Cl.
*A47J 31/06* (2006.01)

(52) U.S. Cl.
CPC ........... *A47J 31/06* (2013.01); *A47J 31/0626* (2013.01); *A47J 31/0636* (2013.01)

(58) Field of Classification Search
CPC ..... A47J 31/06; A47J 31/0626; A47J 31/0636
USPC .................................. 99/298, 316, 317, 323
See application file for complete search history.

(56) References Cited

U.S. PATENT DOCUMENTS

| | | | | |
|---|---|---|---|---|
| 4,865,737 A * | 9/1989 | McMichael | ............. | A47J 31/06 210/477 |
| 4,963,262 A * | 10/1990 | Johnstone | ............... | A47J 31/06 210/474 |
| 5,176,830 A * | 1/1993 | Wiggins | ................... | A47J 31/06 210/477 |
| 5,190,653 A * | 3/1993 | Herrick | .................... | A47J 31/06 210/477 |
| 6,213,001 B1 * | 4/2001 | Gort-Barten | ....... | A47J 27/21191 99/323.3 |
| 8,221,813 B2 * | 7/2012 | Boul | ....................... | A47J 31/08 210/455 |
| 2006/0162572 A1 * | 7/2006 | Chiu Liu | ................ | A47G 19/16 99/317 |
| 2011/0303095 A1 * | 12/2011 | Fu | ........................... | A47J 31/08 99/317 |

FOREIGN PATENT DOCUMENTS

DE         4239380 A1 *  1/1994  .......... A47J 31/0636

* cited by examiner

*Primary Examiner* — Ibrahime A Abraham
*Assistant Examiner* — John J Norton
(74) *Attorney, Agent, or Firm* — Chun-Ming Shih

(57) ABSTRACT

A multipurpose infuser filter strainer, configured to infusing tea and making coffee directly without the need of changing its structural arrangement, include a soft sieve defining opposing top opening and bottom opening, a hard sieve surrounding the soft sieve and defining opposing top opening and bottom opening for receiving the top opening and bottom opening of the soft sieve respectively, a top cap ring fastened to the top opening of hard sieve to hold the top opening of the soft sieve in place, a bottom cap ring fastened to the bottom opening of the hard sieve to hold the bottom opening of the soft sieve in place, and a soft mesh mounted in the bottom cap ring. Further, the mesh size of the soft sieve and the mesh size of the soft mesh are smaller than the mesh size of the hard sieve.

18 Claims, 5 Drawing Sheets

MULTIPURPOSE INFUSER FILTER STRAINER

BACKGROUND OF THE INVENTION

1. Field of the Invention

The present invention relates to infuser filter technology particularly, to a multipurpose infuser filter strainer, which is practical for infusing and filtering tea as well as for making coffee.

2. Description of the Related Art

Commercial brewing apparatuses are configured for infusing tea and brewing coffee separately. An apparatus for infusing tea needs to provide a broad space so that tea leaves can extend out completely. An apparatus for brewing coffee needs to have a small mesh size for filtering fine coffee grounds.

Thus, an apparatus configured for infusing tea is not practical for brewing coffee. On the contrary, an apparatus configured for brewing coffee is not practical for infusing tea. Thus, a consumer needs to spend a lot of money for purchasing different apparatus for infusing tea and brewing coffee.

Therefore, it is desirable to provide an infusion filter strainer that can be used for infusing tea as well as brewing coffee.

SUMMARY OF THE INVENTION

The present invention has been accomplished under the circumstances in view. It is main object of the present invention to provide a multipurpose infuser filter strainer, which is practical for infusing tea as well as making coffee conveniently and directly without the need of changing its structural arrangement.

To achieve this and other objects of the present invention, a multipurpose infuser filter strainer comprises a soft sieve, a hard sieve, a top cap ring, a bottom cap ring, and a soft mesh. The soft sieve comprises a top opening, an opposing bottom opening, and a plurality of mesh holes evenly distributed through the periphery thereof between the top opening and the bottom opening. The hard sieve surrounds the soft sieve. Accordingly, the hard sieve surrounds the soft sieve, protecting the soft sieve from being harmed. Moreover, since the hard sieve surrounds the soft sieve, the soft sieve will not deform its shape therefore will not affect its function.

The hard sieve comprises a top opening receiving the top opening of the hard sieve, an opposing bottom opening receiving the bottom opening of the soft sieve, and a plurality of mesh holes evenly distributed through the periphery thereof between the top opening and the bottom opening. The top cap ring is fastened to the top opening of the hard sieve to hold the top opening of the soft sieve in place. The bottom cap ring is fastened to the bottom opening of the hard sieve to hold the bottom opening of the soft sieve in place. Further, the bottom cap ring defines therein a center opening. The soft mesh is mounted in the bottom cap ring and covered over the center opening of the bottom cap ring, comprising a plurality of mesh holes cut through opposing top and bottom surfaces thereof. Further, the mesh size of the mesh holes of the soft sieve and the mesh size of the mesh holes of the soft mesh are smaller than the mesh size of the mesh holes of the hard sieve.

Preferably, the mesh size of the mesh holes of the soft sieve and the mesh size of the mesh holes of the soft mesh are over 170 meshes. Further, the mesh holes of the hard sieve are configured for filtering tea leaves.

Preferably, the mesh size of the mesh holes of the soft sieve and the mesh size of the mesh holes of the soft mesh are preferably in the range of 170-200 meshes.

Preferably, the mesh size of the mesh holes of the soft sieve and the mesh size of the mesh holes of the soft mesh are preferably in the range of 170-230 meshes.

Preferably, the mesh size of the mesh holes of the soft sieve and the mesh size of the mesh holes of the soft mesh are preferably in the range of 200-230 meshes, or most preferably 200 meshes.

Preferably, the hard sieve is made of stainless steel.

Preferably, a packing member is mounted in the bottom cap ring to secure the soft mesh to the center opening of the bottom cap ring.

Preferably, the top cap ring comprises a positioning flange extended around the periphery thereof.

Subject to the arrangement of the soft sieve, the hard sieve and the soft mesh, the multipurpose infuser filter strainer is practical for infusing tea as well as for making coffee conveniently and directly without the need of changing its structural arrangement.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
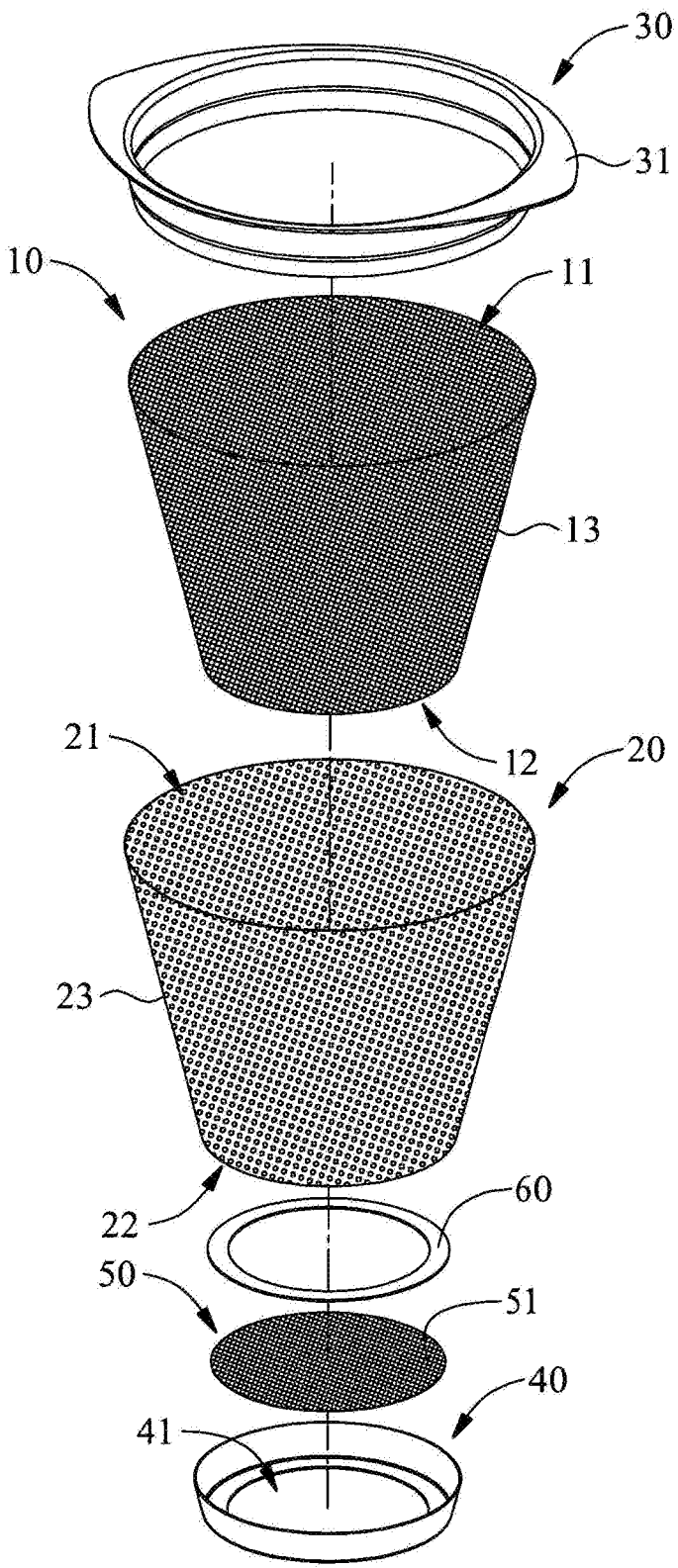
FIG. 1 is an exploded view of a multipurpose infuser filter strainer in accordance with the present invention.

Referring to FIGS. 1-4, a multipurpose infuser filter strainer 100 in accordance with the present invention is shown. The multipurpose infuser filter strainer 100 comprises a soft sieve 10, a hard sieve 20, a top cap ring 30, a bottom cap ring 40, and a soft mesh 50.

The soft sieve 10 comprises a top opening 11, an opposing bottom opening 12, and a plurality of mesh hole 13 evenly distributed through the periphery thereof between the top opening 11 and the bottom opening 12.

The hard sieve 20 surrounds the soft sieve 10, comprising a top opening 21 receiving the top opening 11 of the soft sieve 10, an opposing bottom opening 22 receiving the bottom opening 12 of the soft sieve 10, and a plurality of mesh hole 23 evenly distributed through the periphery thereof between the top opening 21 and the bottom opening 22. Accordingly, the hard sieve 20 surrounds the soft sieve 10, protecting the soft sieve from being harmed. Moreover, since the hard sieve 20 surrounds the soft sieve 10, the soft sieve 10 will not deform its shape therefore will not affect its function.

The top cap ring 30 is fastened to the top opening 21 of the hard sieve 20 to hold the top opening 11 of the soft sieve 10 in place. More specifically, the peripheral edge of the top opening 11 of the soft sieve 10 can be clamped in between the top cap ring 30 and the top opening 21 of the hard sieve 20. Further, spot welding can be applied to enhance the connection.

The bottom cap ring 40 is fastened to the bottom opening 22 of the hard sieve 20 to hold the bottom opening 12 of the soft sieve 10 in place. Further, the bottom cap ring 40 defines therein a center opening 41. More specifically, the peripheral edge of the bottom opening 12 of the soft sieve 10 can be clamped in between the bottom cap ring 40 and the bottom opening 22 of the hard sieve 20. Further, spot welding can be applied to enhance the connection.

Figure 2:
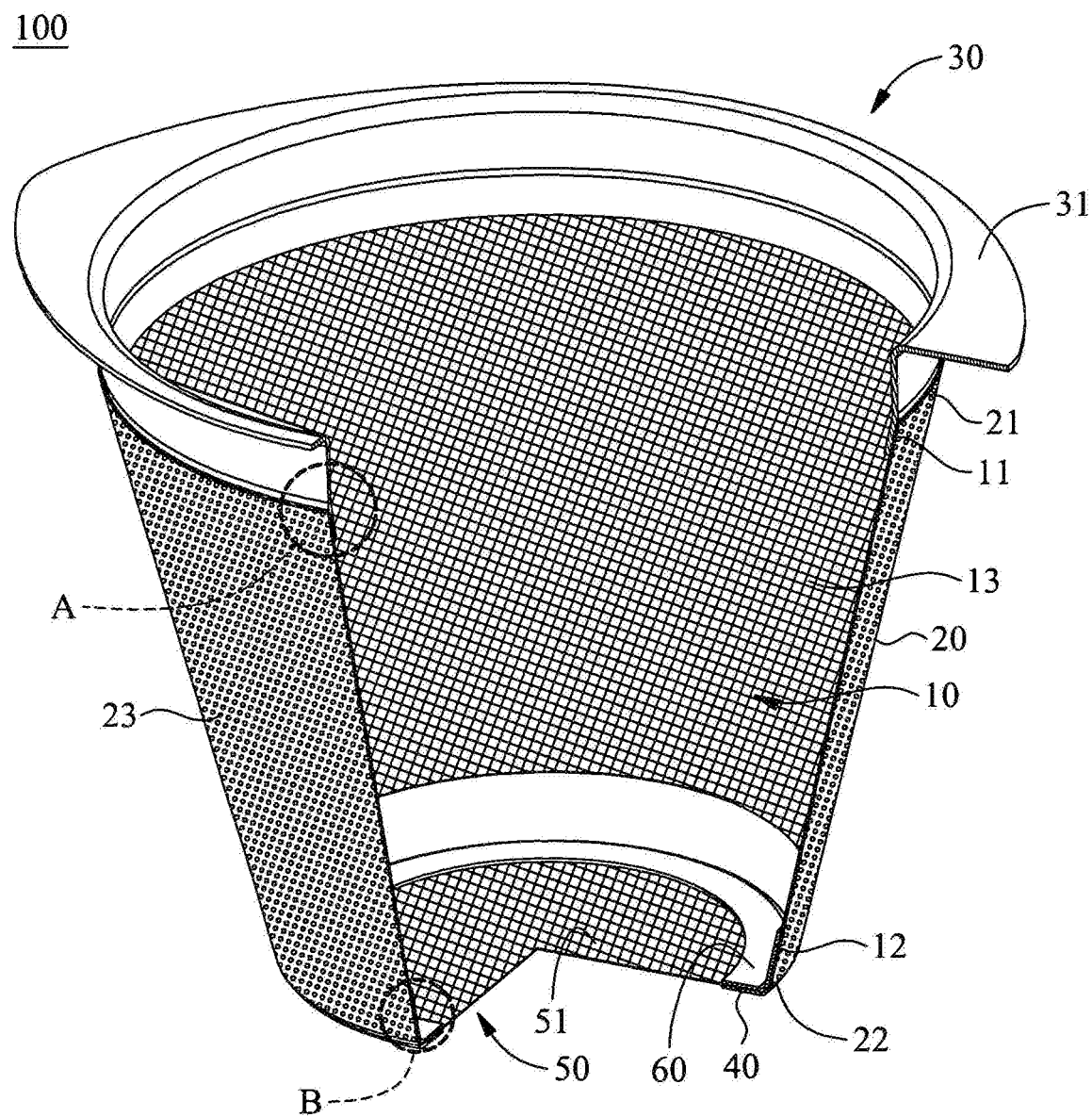
FIG. 2 is a sectional elevational view of the multipurpose infuser filter strainer in accordance with the present invention.
Figure 3:
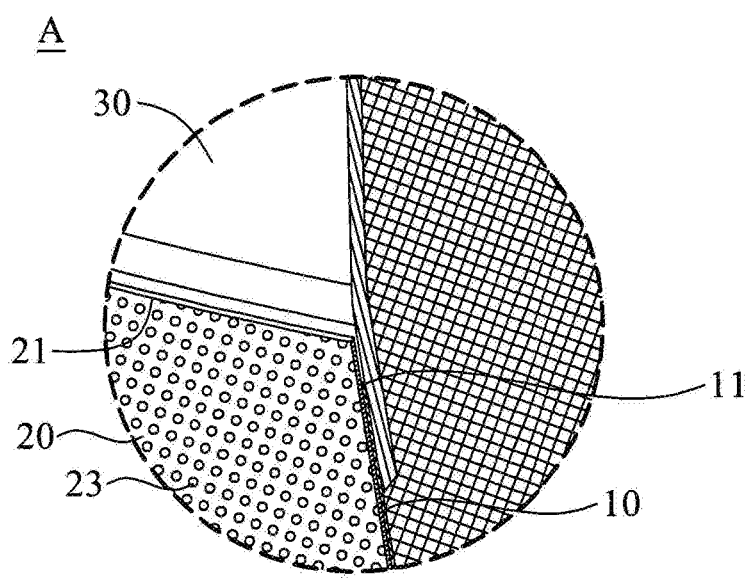
FIG. 3 is an enlarged view of Part A of FIG. 2.
Figure 4:
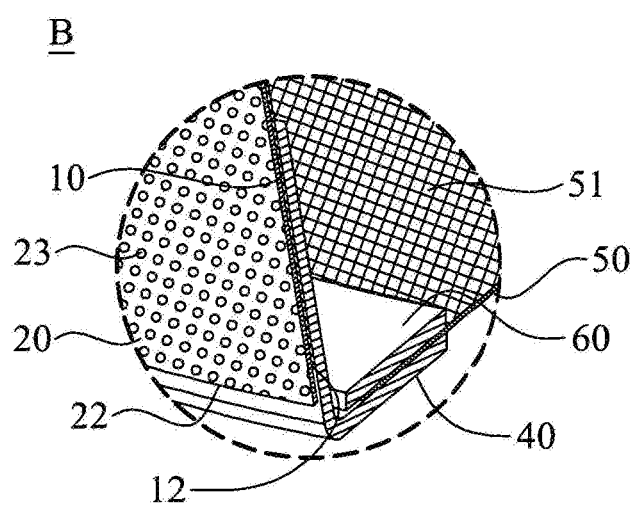
FIG. 4 is an enlarged view of Part B of FIG. 2.

The soft mesh 50 is mounted in the bottom cap ring 40, and covered over the center opening 41 of the bottom cap ring 40. The soft mesh 50 has a plurality of mesh holes 51 cut through opposing top and bottom surfaces thereof and evenly distributed. Further, as illustrated in FIG. 1, FIG. 2 and FIG. 4, the soft mesh 50 is fastened to the center opening 41 of the bottom cap ring 40 by a packing member 60. Thus, the packing member 60 protects the soft mesh 50 against vibration or deformation during tea infusing or coffee brewing.

As illustrated in FIG. 1, the mesh size of the mesh holes 13 of the soft sieve 10 and the mesh size of the mesh holes 51 of the soft mesh 50 are smaller than the mesh size of the mesh holes 23 of the hard sieve 20. Thus, the multipurpose infuser filter strainer 100 can be used for infusing tea as well as for brewing coffee. Preferably, the mesh size of the mesh holes 13 of the soft sieve 10 and the mesh size of the mesh holes 51 of the soft mesh 50 are larger than 170 meshes so that they can effectively filter coffee grounds when the multipurpose infuser filter strainer 100 is used for making coffee. Further, the mesh size of the mesh holes 23 of the hard sieve 20 is not particularly limited as long as it can be used to block the passage of tea leaves. In other words, the said mesh holes of said hard sieve are configured for filtering tea leaves.

Further, in order to improve the coffee brewing quality of the multipurpose infuser filter strainer 100, the mesh size of the mesh holes 13 of the soft sieve 10 and the mesh size of the mesh holes 51 of the soft mesh 50 are preferably in the range of 170-200 meshes, the mesh size of the mesh holes 13 of the soft sieve 10 and the mesh size of the mesh holes 51 of the soft mesh 50 are preferably in the range of 170-230 meshes, the mesh size of the mesh holes 13 of the soft sieve 10 and the mesh size of the mesh holes 51 of the soft mesh 50 are preferably in the range of 200-230 meshes, or most preferably 200 meshes.

Further, the soft sieve 10, the hard sieve 20, the top cap ring 30, the bottom cap ring 40 and the soft mesh 50 are preferably made of stainless steel, facilitating cleaning, mounting and positioning.

Figure 5:
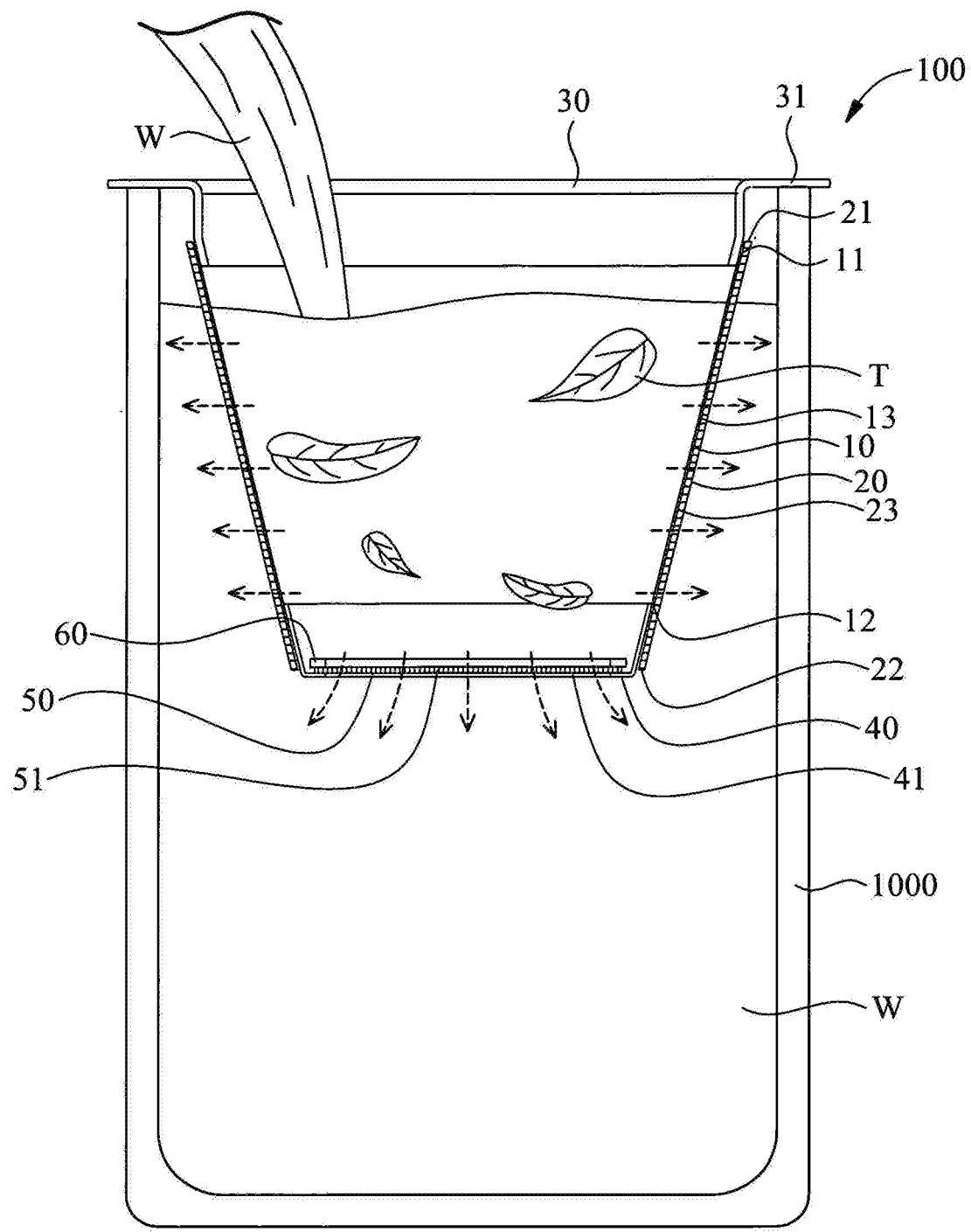
FIG. 5 is a schematic applied view of the present invention, illustrating the multipurpose infuser filter strainer used in tea infusion.
Figure 6:
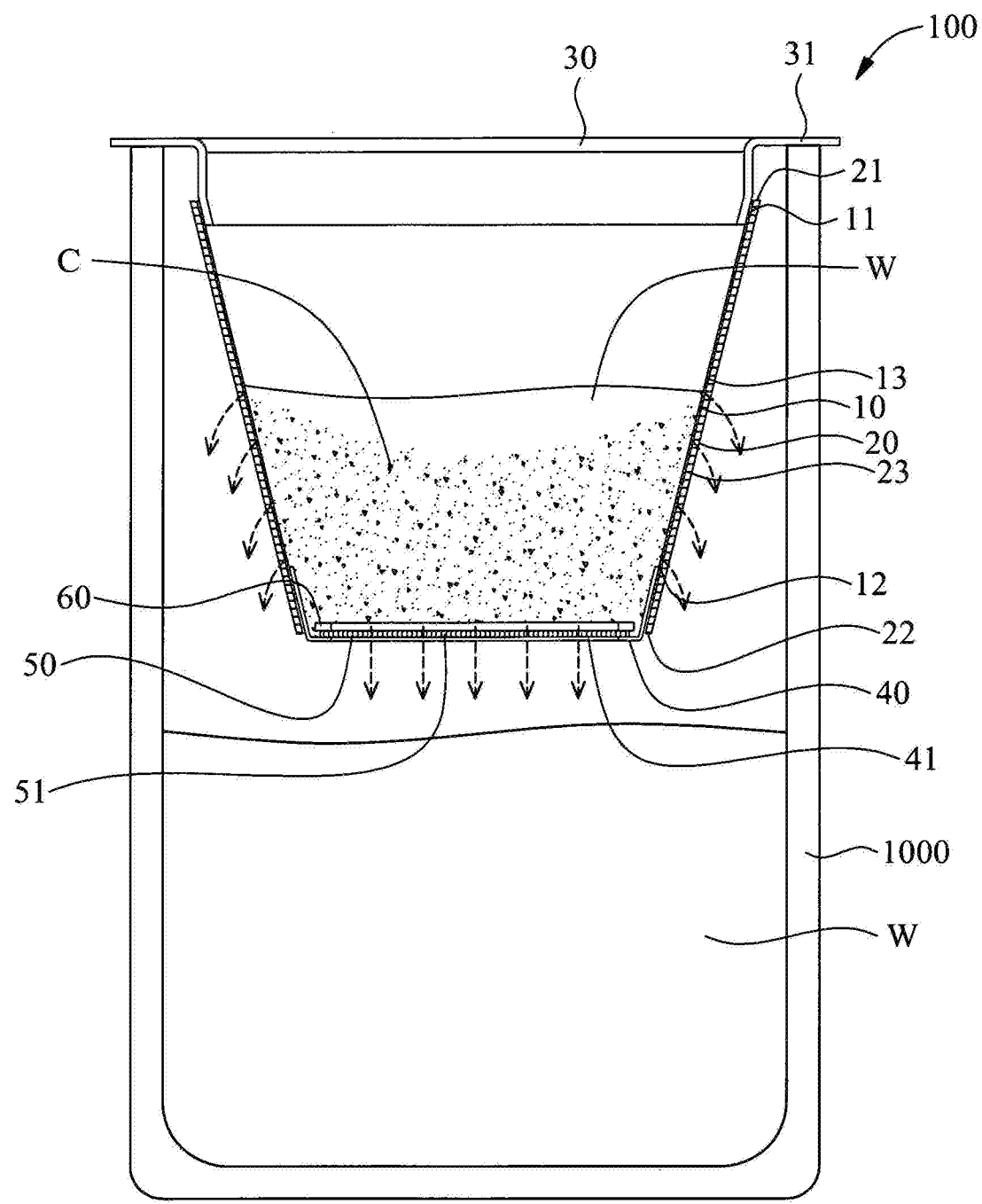
FIG. 6 is a schematic applied view of the present invention, illustrating the multipurpose infuser filter strainer used in coffee preparation.

Thereafter, the application of the multipurpose infuser filter strainer 100 is outlined hereinafter with reference to FIG. 5 and FIG. 6, where FIG. 5 illustrates the application of the multipurpose infuser filter strainer 100 in infusing tea; FIG. 6 illustrates the application of the multipurpose infuser filter strainer 100 in making coffee.

As illustrated in FIG. 5, when using the multipurpose infuser filter strainer 100 to infuse tea, put tea leaves T in the space surrounded by the soft sieve 10 and the soft mesh 50, and then put the multipurpose infuser filter strainer 100 in a container 1000, and then pour an appropriate amount of hot water W in the space surrounded by the soft sieve 10 and the soft mesh 50 to infuse the tea leaves T. When infusing the tea leaves T with hot water W, the tea leaves T are extended out in the space surrounded by the soft sieve 10 and the soft mesh 50, enabling the teat liquid to flow through the mesh holes 13 of the soft sieve 10 and the mesh holes 23 of the hard sieve 20 or the mesh holes 51 of the soft mesh 50 into the container 1000, finishing the infusion of tea.

As illustrated in FIG. 6, when using the multipurpose infuser filter strainer 100 to make coffee, put prepared coffee powder C in the space surrounded by the soft sieve 10 and the soft mesh 50, and then put the multipurpose infuser filter strainer 100 in a container 1000, and then pour hot water W in the space surrounded by the soft sieve 10 and the soft mesh 50 to brew the coffee powder C. When brewing the coffee powder C with hot water W, the coffee powder C will be stopped by the soft sieve 10 and the soft mesh 50 in the space surrounded by the soft sieve 10 and the soft mesh 50, and the fluid coffee thus made will flow properly through the mesh holes 13 of the soft sieve 10 and the mesh holes 23 of the hard sieve 20 or the mesh holes 51 of the soft mesh 50 into the container 1000, finishing the preparation of coffee.

As stated above, when using the multipurpose infuser filter strainer 100 to infuse tea, the tea leaves T can be infused to fully extend out in the space surrounded by the soft sieve 10 and the soft mesh 50, achieving tea infusion. Further, the multipurpose infuser filter strainer 100 can be directly used for making coffee without changing its structure. When brewing coffee, the coffee powder C can be stopped by the soft sieve 10 and the soft mesh 50 in the space surrounded by the soft sieve 10 and the soft mesh 50 so that the fluid coffee thus made does not contain coffee grounds and provides a good taste.

Referring to FIGS. 1, 5 and 6 again, in order to facilitate using the multipurpose infuser filter strainer 100, the top cap ring 30 provides a positioning flange 31 extended around the periphery thereof for supporting the multipurpose infuser filter strainer 100 in a container 1000.

In conclusion, the invention provides a multipurpose infuser filter strainer comprising a soft sieve, a hard sieve and a soft mesh. The multipurpose infuser filter strainer is practical for infusing tea as well as for making coffee conveniently and directly without the need of changing its structural arrangement.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A multipurpose infuser filter strainer, comprising:
   a soft sieve comprising a top opening, an opposing bottom opening and a plurality of mesh holes evenly distributed through the periphery thereof between the top opening and the bottom opening of the soft sieve;
   a hard sieve surrounding the soft sieve, the hard sieve comprising a top opening receiving the top opening of the soft sieve, an opposing bottom opening receiving the bottom opening of the soft sieve, and a plurality of mesh holes evenly distributed through the periphery thereof between the top opening and the bottom opening of the hard sieve;
   a top cap ring fastened to the top opening of the hard sieve to hold the top opening of the soft sieve in place;

a bottom cap ring fastened to the bottom opening of the hard sieve to hold the bottom opening of the soft sieve in place, the bottom cap ring defining therein a center opening; and a soft mesh mounted in the bottom cap ring and covered over the center opening of the bottom cap ring, the soft mesh comprising a plurality of mesh holes cut through opposing top and bottom surfaces thereof;

wherein the mesh size of the mesh holes of the soft sieve and the mesh size of the mesh holes of the soft mesh are smaller than the mesh size of the mesh holes of the hard sieve, and the infuser filter strainer is configured to infuse tea and to brew coffee; and wherein the bottom cap is mounted with only the soft mesh to cover the bottom openings of the soft sieve and the hard sieve.

2. The multipurpose infuser filter strainer as claimed in claim 1, wherein the mesh size of the mesh holes of the soft sieve and the mesh size of the mesh holes of the soft mesh are over 170 meshes.

3. The multipurpose infuser filter strainer as claimed in claim 2, wherein the mesh size of the mesh holes of the soft sieve and the mesh size of the mesh holes of the soft mesh are in the range of 200-230 meshes.

4. The multipurpose infuser filter strainer as claimed in claim 3, wherein the mesh size of the mesh holes of the soft sieve and the mesh size of the mesh holes of the soft mesh are 200 meshes.

5. The multipurpose infuser strainer as claimed in claim 1, wherein the hard sieve is made of stainless steel.

6. The multipurpose infuser strainer as claimed in claim 2, wherein the hard sieve is made of stainless steel.

7. The multipurpose infuser strainer as claimed in claim 3, wherein the hard sieve is made of stainless steel.

8. The multipurpose infuser strainer as claimed in claim 4, wherein the hard sieve is made of stainless steel.

9. The multipurpose infuser filter strainer as claimed in claim 1, further comprising a packing member mounted in the bottom cap ring to secure the soft mesh to the center opening of the bottom cap ring.

10. The multipurpose infuser filter strainer as claimed in claim 9, wherein the top cap ring comprises a positioning flange extended around the periphery thereof.

11. The multipurpose infuser filter strainer as claimed in claim 2, further comprising a packing member mounted in the bottom cap ring to secure the soft mesh to the center opening of the bottom cap ring.

12. The multipurpose infuser filter strainer as claimed in claim 11, wherein the top cap ring comprises a positioning flange extended around the periphery thereof.

13. The multipurpose infuser filter strainer as claimed in claim 3, further comprising a packing member mounted in the bottom cap ring to secure the soft mesh to the center opening of the bottom cap ring.

14. The multipurpose infuser filter strainer as claimed in claim 4, further comprising a packing member mounted in the bottom cap ring to secure the soft mesh to the center opening of the bottom cap ring.

15. The multipurpose infuser filter strainer as claimed in claim 1, wherein the top cap ring comprises a positioning flange extended around the periphery thereof.

16. The multipurpose infuser filter strainer as claimed in claim 1, wherein the top cap ring comprises a positioning flange extended around the periphery thereof.

17. The multipurpose infuser filter strainer as claimed in claim 1, wherein the top cap ring comprises a positioning flange extended around the periphery thereof.

18. The multipurpose infuser filter strainer as claimed in claim 1, wherein the top cap ring comprises a positioning flange extended around the periphery thereof.

* * * * *